Nov. 6, 1928.
F. H. CARSSOW
OPTICAL INSTRUMENT
Filed Aug. 16, 1926
1,690,270
4 Sheets-Sheet 3
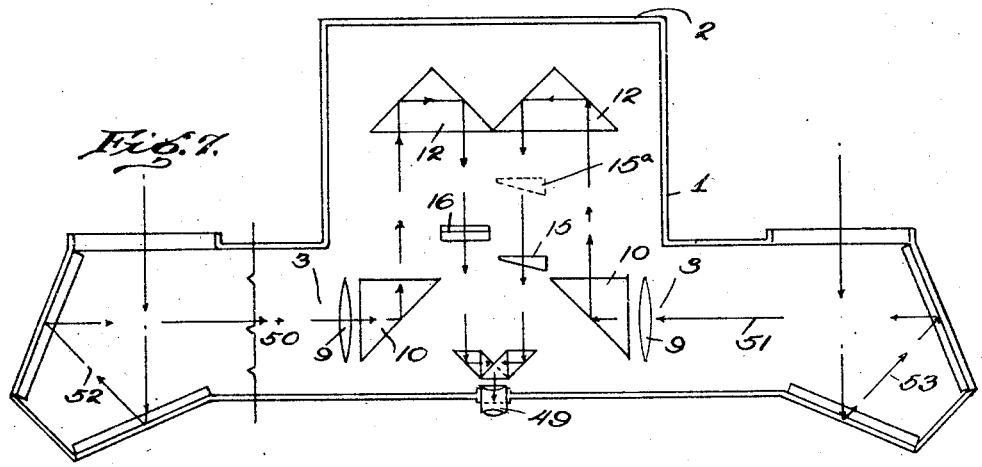
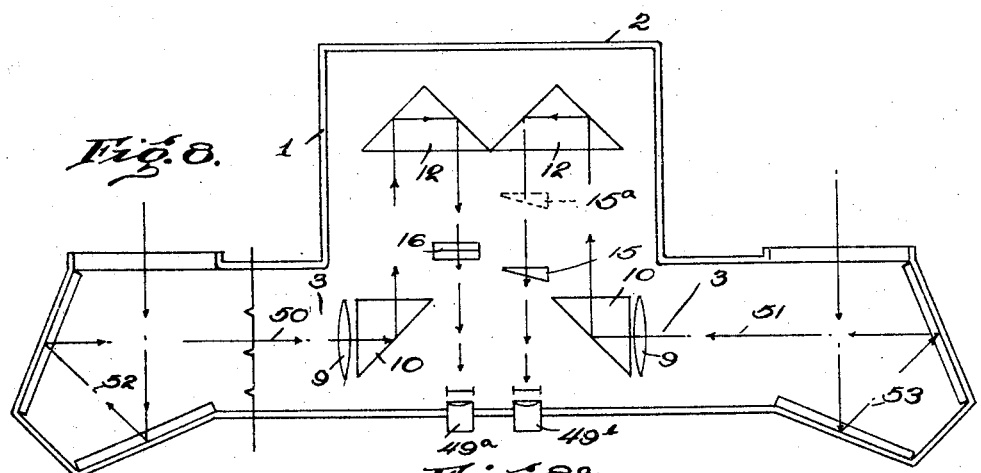
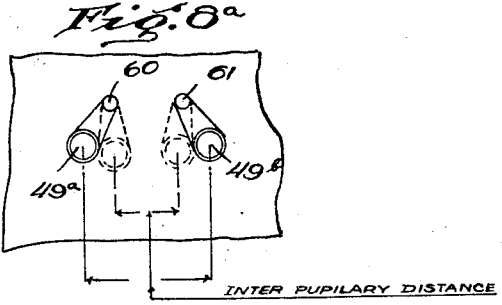
INVENTOR
Felix H Carssow
BY
O'Neill & Bunn
ATTORNEYS Nov. 6, 1928.  
F. H. CARSSOW  
1,690,270  
OPTICAL INSTRUMENT  
Filed Aug. 16, 1926     4 Sheets-Sheet 4

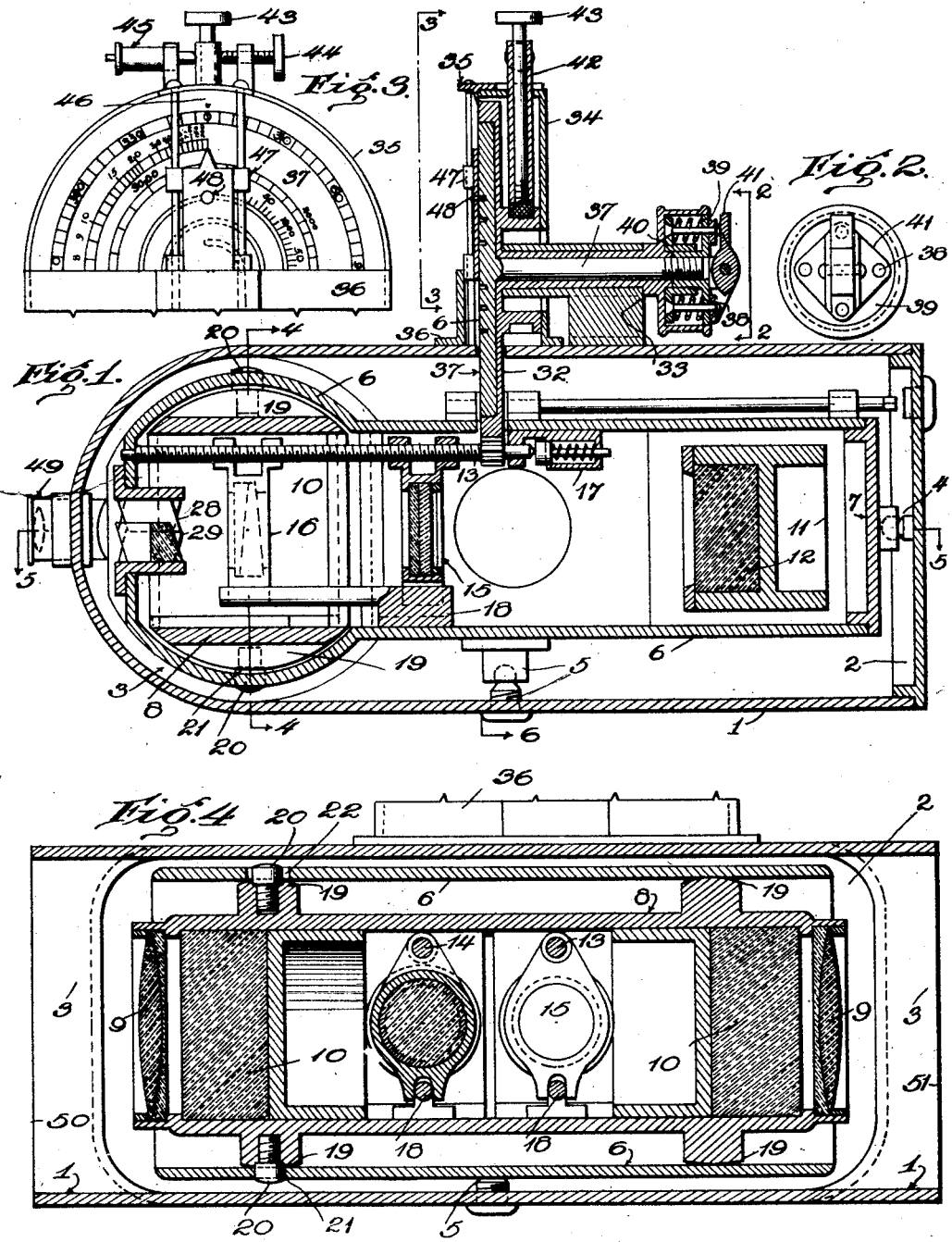

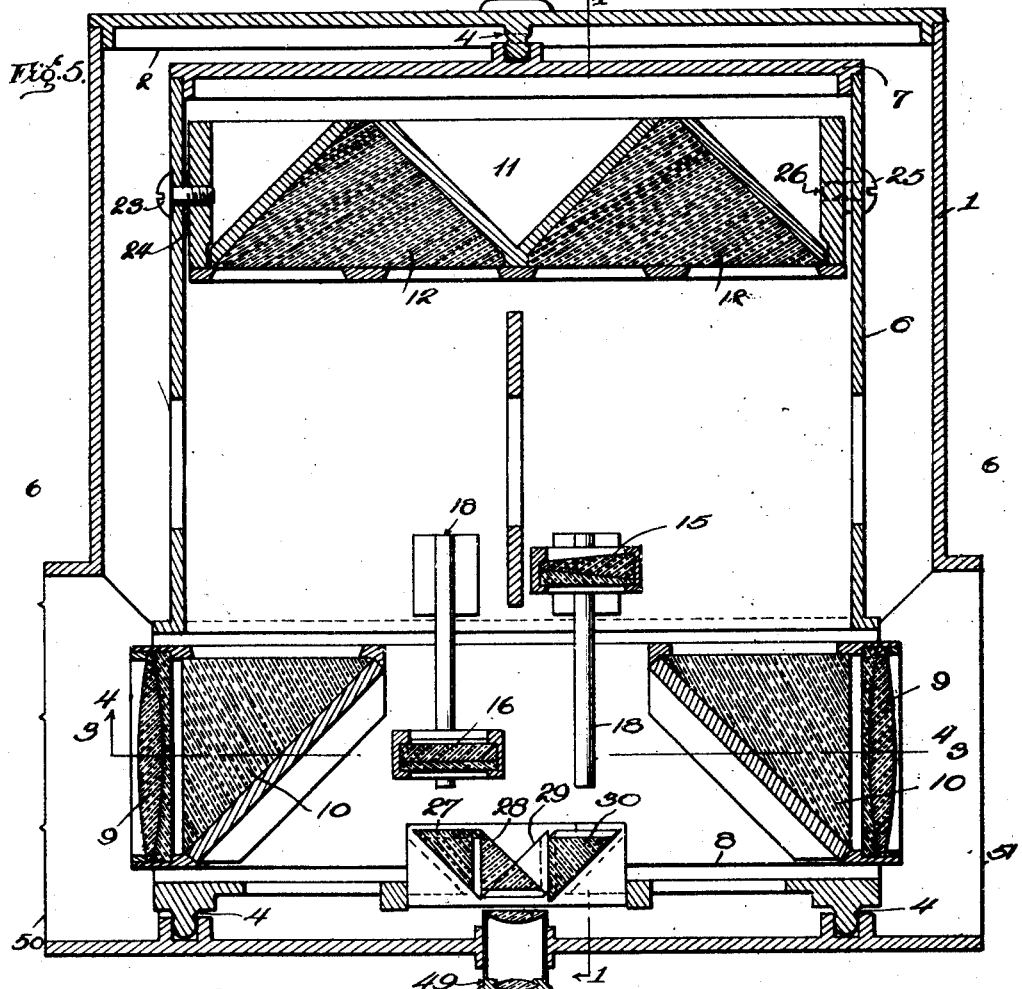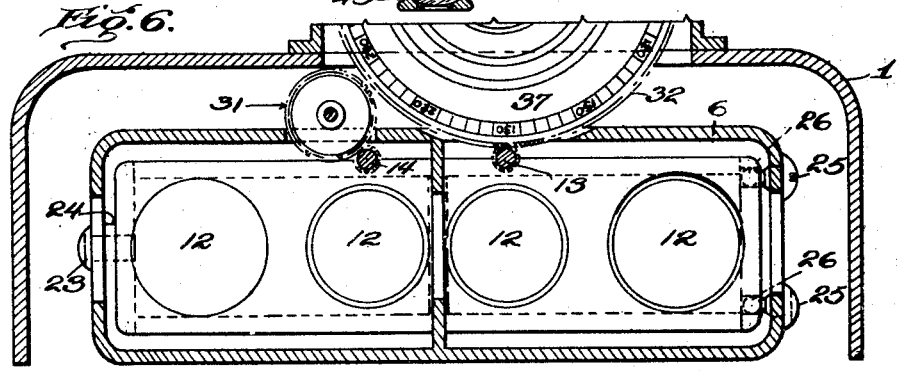

INVENTOR  
Felix H. Carssow  
BY  
O'Neill & Bunn  
ATTORNEYS

Patented Nov. 6, 1928.

1,690,270

UNITED STATES PATENT OFFICE.

FELIX H. CARSSOW, OF VALLEJO, CALIFORNIA.

OPTICAL INSTRUMENT.

Application filed August 16, 1926. Serial No. 129,421.

This invention relates to a geometrical instrument and particularly pertains to range finders of the self-contained base type.

The objects of my invention are,—first, to provide an instrument in which the distance between the objective lenses is reduced to a minimum in order to diminish the deforming effects produced by unequal temperature distribution in the lens carrier; second, to collect in a compact middle group all the optical parts, except the optical square at each end of the base, and such optical elements as are associated with the optical squares, when an infinite adjuster is incorporated in the construction of the instrument; and third, to so arrange and support the optical parts belonging to this middle group that their adjustments will be least disturbed by the distortions and displacements due to temperature changes, shocks and vibrations.

When placing the objective lenses the minimum distance apart,—in special cases even merging them into one,—it is essential that the light rays transmitted by them be turned through 90 degrees by a reflector adjacent to the same, and directed to a rear set of reflectors where they are turned through 180 degrees, therefrom continuing in separate paths toward the observer. In the monocular instrument, the light rays after leaving the rear set of reflectors pass through a system of eye-piece prisms to appear at the focal plane common to the objectives and eye-piece, as complementary partial image fields. In the binocular instrument, the light rays after leaving the rear set of reflectors are brought to focus as stereoscopically complementary image fields, each in the focal plane of its telescopic combination.

Broadly considered, the instrument in which this invention is concerned, consists of the optical elements and their mountings collected in a compact middle group, embodying the novel features, combined with light passage tubes, to the outer ends of which are attached the base terminating optical squares.

Figure 9:
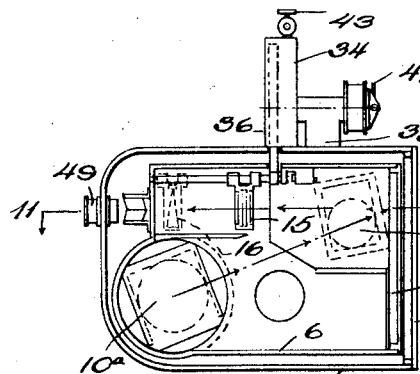
Figure 10:
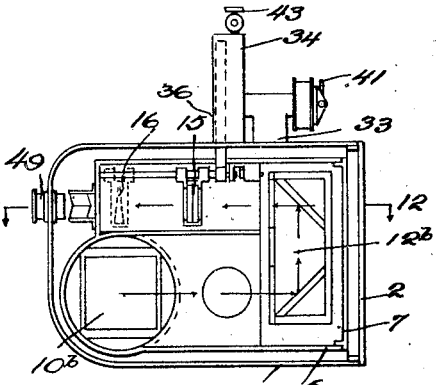
Figure 11:
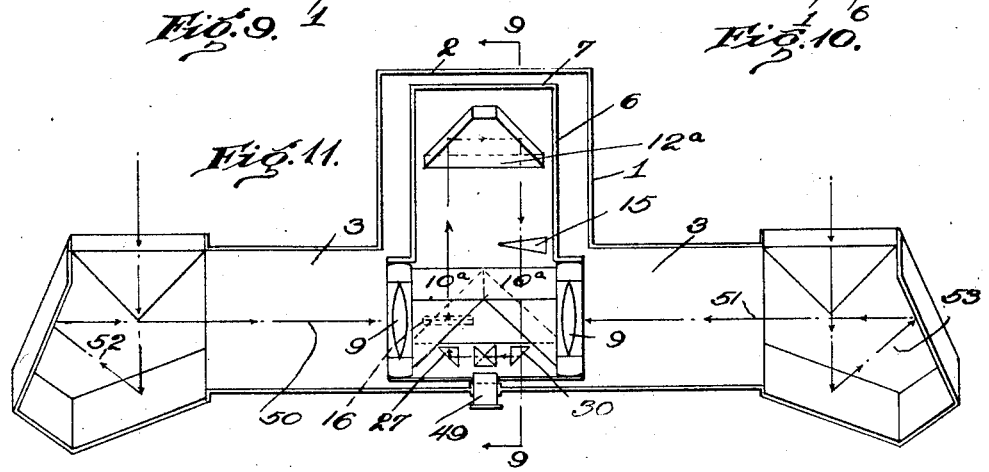
Figure 12:
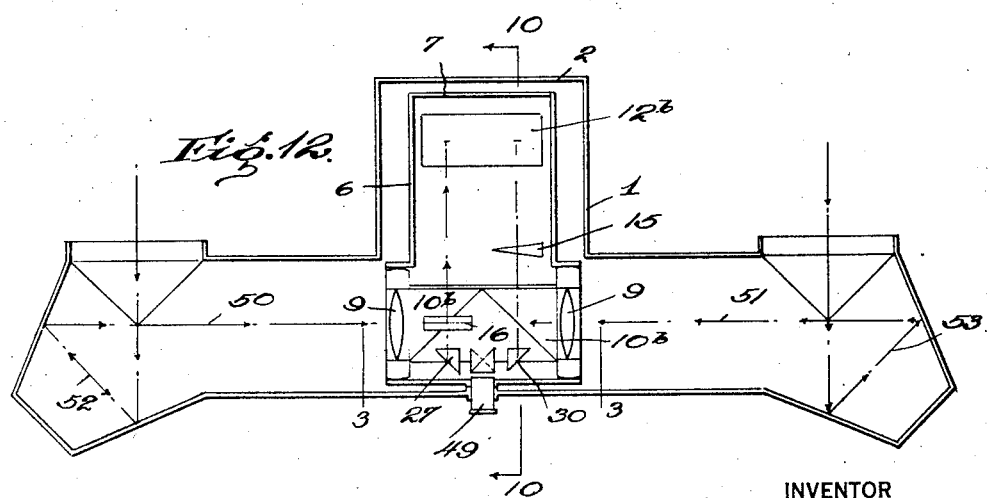

The invention is illustrated, in an examplary way, by the accompanying drawings, in which:

Figure 1 is an enlarged transverse sectional view through a monocular co-incidence instrument embodying the principles of my invention; Fig. 2 is a front elevation looking in the direction of line 2—2, of Fig. 1 showing the cam used in locking together and freeing from one another the range dial and the adjusting ring gear of the instrument shown in Fig. 1; Fig. 3 is a front elevation looking in the direction of line 3—3 of Fig. 1 illustrating parts of the range dial and adjusting ring gear of the instrument shown in Fig. 1; Fig. 4 is a partial view of a longitudinal section along line 4—4 of Fig. 1 and shows the objective lenses and the adjacent or objective reflectors in their carrier, and the measuring and adjusting prisms; Fig. 5 is a horizontal section along line 5—5 of Fig. 1; Fig. 6 is a partial view of a vertical section through the instrument along line 6—6 of Fig. 1 and shows the gears and shafts used in moving the measuring and adjusting prisms; Fig. 7 is a horizontal central section, looking downwardly showing diagrammatically the arrangement of the optical parts of the middle group illustrated in detail in Figs. 1 to 6 inclusive, and their relationship to the optical squares for the monocular co-incidence instrument; Fig. 8 is a horizontal central section looking downwardly, showing diagrammatically an instrument similar to that shown in Fig. 7, but modified to apply to a binocular stereoscopic range finder; Fig. 8ª is a diagrammatic view illustrating the adjustability of the inter-pupillary distance for the eye-pieces in a binocular type of range finder; Fig. 9 is a vertical section along line 9—9 of Fig. 11, and shows, diagrammatically the arrangement of the optical parts of the middle group for an instrument in which the rear set of reflectors consists of two reflecting surfaces whose inter-section lies in a plane substantially normal to the longitudinal axis of the optical base; Fig. 10 is a vertical section along line 10—10 of Fig. 12, and shows diagrammatically the arrangement of the optical parts of the middle group for an instrument in which the rear set of reflectors consists of two reflecting surfaces whose inter-section is substantially parallel to the longitudinal axis of the optical base; and Figs. 11 and 12 are horizontal sections along the lines 11—11 and 12—12 of Figs. 9 and 10 respectively showing diagrammatically the arrangement of the optical parts of the middle group and their relationship to the optical squares.

Similar letters and numbers refer to similar parts throughout the several views.

Referring to the drawings in detail, the outer casing of the middle group consists of parts 1 and 2, detachably fastened together. Part 1 is connected at the light passageways 3, with the light passage tubes 50 and 51, and through them with the optical squares 52 and 53. Held in place within this casing by the bosses and sockets 4 and the screw point and socket 5, are the inner casing parts 6 and 7, also detachably fastened together. Within this inner casing are mounted, the carrier 8, with the objectives 9, and their adjacent or objective reflectors 10; the carrier 11, with the rear set of reflectors 12; the measuring and halving prism screws and pinions 13 and 14, on which travel the cells containing the measuring and halving prisms 15 and 16; the spring cases 17, with springs and plugs for holding 13 and 14 in their true positions; and the measuring and halving prism guides 18. The carrier 8 with its segments of spherical surfaces 19, bears on the cylindrical surfaces of 6 without transmitted strains and is held by the heads of the screws 20, bearing against the sides of the cylindrical hole 21, and the oblong hole 22. The carrier 11 is held in place without the introduction of exterior distorting strains to itself, by the screw 23 and the elastic washer 24 and the spherical points of the screws 25 resting in the neat fitting holes 26. To the front of the inner casing is attached a cell containing the eye-piece prisms 27, 28, 29 and 30. On the top of the inner casing is mounted a rotatable shaft with the gear 31 meshing with the pinion of 14. One end of this shaft is formed to receive a key by which it is turned when making halving adjustments.

On the top of the outer casing is mounted the adjusting ring gear 32 meshing with the pinion of the measuring prism screw 13 and is supported by the bearing 33 and enclosed by the case parts 34, 35 and 36. Through the tubular part of 32 passes the stem of the range dial 37, and they are held to rotate as one by the springs and bolts 38, and the fixed and sliding spring seats 39 and 40, when the cam and cam plate 41 are in the position shown. When the cam is turned from the position here shown it lifts 40 from pressure contact with 32, and permits relative rotation between the range dial 37 and the adjusting ring gear 32. In order to rotate 32 gradually or hold it fixed, a clamp ring 42, encircling a cylindrical part of 32 may be locked to the same by the clamp screw 43. Rotary motion may then be communicated to the adjusting ring gear by the tangent screw 44, and the opposing spring and plug in the spring case 45 carried by the standards attached to the case part 34. An index line 46 on 35 shows the angular position of the adjusting ring gear when testing the infinite distance readings. The plate 47 moves up and down along guide rods, and carries a projection 48 which fits in the spiral groove on the face of the range dial, so that its pointer always remains at the edge of the range scale, and indicates the range. A positive eye-piece 49 is mounted on the front part of the outer casing and is capable of being moved along its axis for purposes of focussing.

The eye-piece prism system here shown consists of two pairs of like triangular prisms. Each prism is shown with its hypothenuse surface perpendicular to its bases or ends, and its light transmitting surfaces making equal angles, one with the base and one with the top of the prism. Together they act on the transmitted light rays like the parallel sides of a glass plate. By arranging these prisms in pairs, a ray of light in passing through them emerges undivided as well as parallel to its incident direction. The two prisms directly in front of the eye-piece have their hypothenuse surfaces crossed and the lines formed by the intersection of their contact and emergent surfaces are super-posed to form the separating line lying in the focal plane of the objectives and eye-piece. The emergent surfaces slope from the separating line, toward the eye-piece, rendering the contact surfaces invisible when viewed through the eye-piece, and the separating line is seen as a sharp line between the upper and lower half image fields. The images formed under the condition shown in the drawings are inverted though normal as to right and left. To make the images normal as to the vertical direction, or re-invert them, the hypothenuse surfaces of 27 and 30 or 28 and 29, or one of the cathetus surfaces of each of the rear prisms 12, should be ground as a roof angle. In the steroscopic instrument here digrammatically illustrated, the eye-piece prisms are omitted, and in order to make the images vertically normal one of the cathetus surfaces of each prism 12, should be ground to a roof angle.

Variations of the optical arrangements shown in the accompanying drawings can be made by shifting the objective lenses from the positions shown to positions between the objective reflectors and the rear set of reflectors. Other variations can be made especially when the above inter-change of positions of the objectives and objective reflectors is made to optical combinations like that shown in Figs. 11 and 12, wherein the two objectives can be replaced by one centrally located lens, and the light rays moving from the rear set of reflectors to the eye-piece or eye-pieces can be directed in separate paths, as a pair either over the top or below the bottom or around one or the other side of the objective reflector, or one over the top and the other beneath the bottom or one around each side of the objective reflector.

In Fig. 7 I have illustrated the optical path through the monocular co-incidence instrument where the light rays are represented as entering the optical squares 52 and 53 and being reflected therefrom through light passage tubes 50 and 51 of the light passageways 3. The light passes through the objectives 9 and their adjacent or objective reflectors 10 to the set of rear reflectors 12 and thence through the measuring and halving prisms 15 and 16 to the eye-piece prisms 27, 28, 29 and 30 where the light is focussed in the eye-piece 49.

In Fig. 8 I have shown the principle of my invention as applied to a binocular stereoscopic range finder and the passage of the light rays to the separate field lenses in the two separate eye-pieces 49$^a$ and 49$^b$. As represented in both Figs. 7 and 8 the measuring and halving prisms 15 and 16 are adjustable in position. The measuring and halving prism 15 may occupy for example the dotted line position 15$^a$ under control of the tangent screw 44. As represented in Fig. 8$^a$ the binocular instrument may have the eye-pieces 49$^a$ and 49$^b$ laterally adjustable for controlling the inter-pupillary distance. The lens carriers for the eye-pieces 49$^a$ and 49$^b$ may be pivotally mounted at 60 and 61 allowing the lenses to be adjusted for the convenience of different observers.

In Fig. 9 I have shown diagrammatically the arrangement of optical parts for the middle group of a range finder where the separate rear set of reflectors 12 described in connection with Figs. 1 to 8 are replaced by a single rear reflector 12$^a$ consisting of two reflecting surfaces illustrated more clearly in Fig. 11 whose inter-section lies in a plane substantially normal to the longitudinal axis of the optical base. Separate objective reflectors 10$^a$ have been illustrated for directing light to the rear reflectors. The passage of light through this arrangement of range finder is shown more clearly in Fig. 11 by the lines having indicating arrows thereon for delivering the light to the eye-pieces 49.

In Fig. 10 I have shown diagrammatically the arrangement of parts of the middle group for a range finder in which the rear set of reflectors consists of two reflecting surfaces whose inter-section is substantially parallel to the longitudinal axis of the optical base. In this construction the rear reflector comprises a single reflecting body 12$^b$ as illustrated more clearly in Fig. 12. The reflector 12$^b$ has two reflecting surfaces whose inter-section is substantially parallel to the longitudinal axis of the optical base and serve to cooperate with the objective reflectors 10$^b$. The passage of light through the range finder in the cases where the rear reflector is formed by a single reflector will be more clearly understood by considering Figs. 9 and 11 and 10 and 12 jointly inasmuch as the light rays pass in the same vertical plane in the horizontal sections of Figs. 11 and 12 and can only be seen in the vertical sections of Figs. 9 and 10 in proper arrangement.

I have described preferred embodiments of my invention in a range finder but I desire that it be understood that modifications may be made and that no limitations upon the invention are intended other than those imposed by the scope of the appended claims.

What I claim as new and desire to secure by Letters Patent of the United States is as follows:

1. A range finder comprising in combination a casing having light passage tubes extending in opposite directions therefrom, a central inner casing mounted in said first mentioned casing, said central inner casing being arranged to receive a removable carrier at each end thereof, reflectors mounted in each of said carriers, objective lenses mounted adjacent the reflectors in the end of said carrier adjacent said light passage tubes, optical means for receiving light rays and directing said rays through said objective lenses onto the reflectors adjacent thereto where they are directed toward said reflectors at the opposite end of said carrier, measuring and halving prisms interposed in the path of light reflected by said last mentioned reflectors and each independently adjustable in position with respect to said reflectors and an ocular system for observing the images of a distant object.

2. A range finder comprising in combination an outer casing having a pair of light passage tubes extending in opposite directions, optical means in each of said tubes for receiving and reflecting light rays from a distant object, a casing centrally mounted within said first mentioned casing and provided with a detachable carrier at each end thereof, reflectors mounted in each of said carriers, objective lenses mounted adjacent the reflectors in the carrier adjacent said light passage tubes for transmitting light from said optical means and aiding in the directing of the same upon said reflectors at the opposite end of said casing, an image observing system mounted on the parts of said casings which lie adjacent said light passage tubes, prisms forming part of said image observing system, and a pair of measuring and halving prisms interposed in the path of said first mentioned prisms and light rays received from said last mentioned reflectors, and means for longitudinally adjusting said measuring and halving prisms with respect to said first mentioned prisms, whereby the images of an object may be moved relative to each other while being viewed through said image observing system.

3. A range finder comprising in combination a casing having a pair of oppositely extending light passage tubes, optical means in each of said tubes for receiving and reflecting light rays, a central casing carried within said first mentioned casing and having an independent removable carrier at each end thereof, reflecting surfaces mounted within each of said carriers, objective lenses positioned adjacent the reflecting surfaces in the carrier immediately adjacent said light passage tubes, a pair of measuring and halving prisms adjustable longitudinally within said central casing from the exterior of said first mentioned casing, an image observing system mounted on said central and outer casings for substantial abutment one with respect to the other and aligned with said measuring and halving prisms and with the reflecting surfaces opposite said last mentioned reflecting surfaces for observing a distant object.

4. A range finder comprising in combination a casing having a pair of oppositely extending light passage tubes, optical means for reflecting light rays through said tubes, a separate casing mounted centrally within said first mentioned casing and carrying a detachable optical system for cooperating with said optical means, said optical system comprising sets of reflectors at opposite ends of said separate casing, adjustable measuring and halving prisms located between said reflectors, eye-piece prisms positioned adjacent the end of said separate casing and aligned with said measuring and halving prisms, and an image observing system adjacent said eye-piece prisms in said first mentioned casing for observing a distant object.

5. A range finder comprising in combination a casing having a pair of oppositely extending light passage tubes, optical means in said tubes for reflecting light rays, a separate casing centrally positioned in said first mentioned casing, a detachable carrier mounted in each end of said separate casing and extending laterally thereof, each of said carriers having reflecting surfaces mounted therein and the carrier adjacent said light passage tubes having objective lenses therein for receiving light rays from said optical means in said tubes, measuring and halving prisms mounted within said separate casing and adjustable longitudinally therein by means exterior of said casing, a set of eye-piece prisms mounted in said separate casing and aligned with said measuring and halving prisms; whereby light received from said optical means is passed through said objective lenses and directed at substantially 90 degrees by the reflectors at one end of said separate casing to the reflectors at the opposite end of said separate casing and returned by the last mentioned reflectors to said eye-piece prisms.

6. A range finder comprising in combination a casing, light passage tubes formed by said casing, an inner central casing having its walls spaced from the walls of said first mentioned casing, a carrier positioned in each end of said second mentioned casing, one of said carriers being laterally detachable from said second mentioned casing, and the other carrier being longitudinally removable from said second mentioned casing, reflecting surfaces mounted in said carriers, eye-piece prisms carried by one end of said second mentioned casing and aligned with the reflecting surfaces in one of said carriers, the reflecting surfaces in the other of said carriers being arranged to receive and direct light from said light passage tubes to the reflecting surfaces in said other carrier, said second mentioned carrier having segmentary portions of spherical surfaces located at opposite ends thereof and bearing upon the inner walls of said second mentioned casing.

7. A range finder comprising in combination a casing having light passage tubes extending in opposite directions therefrom, an independent casing centrally mounted within said first mentioned casing and having its walls spaced from the walls of said first mentioned casing, carriers laterally positioned in opposite ends of said independent casing and positively spaced from the walls thereof, said carriers being removable from said independent casing at right angles to each other, each of said carriers having optical elements mounted therein with the reflecting surfaces in one of said carriers aligned with said light passage tubes for directing light to the reflecting surfaces in the other of said carriers, eye-piece prisms centrally positioned in said independent casing in the end adjacent said light passage tubes and aligned with the reflecting surfaces in the opposite end of said independent casing.

8. A range finder comprising in combination a casing having light passage tubes extending in opposite directions therefrom, an independent casing centrally positioned in said first mentioned casing and spaced from the walls thereof, carriers positioned in opposite ends of said independent casing and detatchable by movement in directions at right angles one to the other, light reflecting surfaces mounted in said carriers, one of said carriers having segmentary spherical surfaces on opposite ends thereof for engaging the inner surfaces of said independent casing, and means passing through said independent casing and engaging said segmentary spherical surfaces for securing said carrier in position.

9. A range finder comprising in combination a casing having a pair of oppositely extending light passage tubes, an independent casing mounted centrally within said first mentioned casing, a reflector positioned in opposite ends of said independent casing, means for simultaneously mounting or demounting said reflectors, objective lenses aligned with the reflector in one end of said independent casing adjacent said light passage tubes, means for simultaneously mounting or demounting said objective lenses, the reflector in the opposite end of said independent casing having two reflecting surfaces whose inter-section is substantially parallel to the longitudinal axis of said independent casing, a set of eye-piece prisms located centrally in the end of said independent casing, a pair of measuring and halving prisms interposed between said eye-piece prisms and said last mentioned reflector, whereby light rays received through said light passage tubes are incident upon said eye-piece prisms.

10. A range finder comprising in combination a casing, a pair of light passage tubes extending in opposite directions from said casing, an independent casing centrally positioned within said first mentioned casing, reflecting surfaces carried in opposite ends of said independent casing, a system of eye-piece prisms centrally positioned in one end of said independent casing, a pair of parallel longitudinally extending screws within said independent casing and aligned with the axis of said eye-piece prisms adjacent one side of said independent casing, a pair of parallel extending guides positioned adjacent the opposite side of said independent casing, measuring and halving prisms arranged to be advanced or retracted by said screws along said guides, and means exterior of said first mentioned casing and geared to drive both of said screws for adjusting the position of said measuring and halving prisms along said guides by rotatably driving said screws.

11. A range finder comprising in combination a casing, a pair of light passage tubes extending in opposite directions from said casing, an independent casing centrally mounted within said first mentioned casing, reflecting surfaces mounted in opposite ends of said independent casing, a set of eye-piece prisms mounted in one end of said independent casing, measuring and halving prisms aligned between said eye-piece prisms and one set of said reflecting surfaces, a pair of screws located adjacent the top of said independent casing and rotatable means mounted on the exterior of said first mentioned casing for imparting rotative movement to said screws and adjusting the position of said measuring and halving prisms with respect to said reflecting surfaces.

12. A range finder comprising in combination a casing, a pair of light passage tubes extending in opposite directions from said casing, an independent casing mounted centrally within said first mentioned casing, reflecting surfaces carried in opposite ends of said independent casing, a set of eye-piece prisms mounted centrally within one end of said independent casing and aligned with said reflecting surfaces, independent measuring and halving prisms longitudinally adjustable within said independent casing and rotatable means exterior of said first mentioned casing for simultaneously selecting the position of said independent measuring and halving prisms with respect to said reflecting surfaces, and means for locking said measuring and halving prisms in a selected position.

13. A range finder comprising in combination a casing, a pair of light passage tubes extending in opposite directions from said casing, an independent casing mounted centrally within said first mentioned casing, reflecting surfaces carried in opposite ends of said independent casing, a set of eye-piece prisms mounted centrally within one end of said independent casing and aligned with said reflecting surfaces, independent measuring prisms longitudinally adjustable within said independent casing and rotatable means exterior of said first mentioned casing for simultaneously selecting the position of said independent measuring prisms with respect to said reflecting surfaces, and a spring-pressed friction clutch secured to said rotatable means for locking said measuring prisms in a selected position with respect to said eye-piece prisms between said reflecting surfaces.

14. A range finder comprising in combination a casing, a pair of light passage tubes extending in opposite directions from said casing, an independent casing mounted centrally within said first mentioned casing, reflecting surfaces in opposite ends of said independent casing for receiving and directing light from said light passage tubes, and a system of eye-piece prisms centrally mounted in the end of said independent casing adjacent said light passage tubes, said eye-piece prisms being constituted by two pairs of like triangular prisms, each prism having its hypothenuse surface perpendicular to its bases and its light transmitting surfaces disposed at equal angles with respect to each other and a sight carried by said first mentioned casing and aligned with said triangular prisms in said independent casing, whereby a ray of light in passing through the prisms emerges undivided as well as parallel to its incident directions.

15. A range finder comprising in combination a casing, a pair of light passage tubes extending in opposite directions from said casing, an independent casing mounted centrally within said first mentioned casing, reflecting surfaces in opposite ends of said independent casing for receiving and directing light from said light passage tubes, the reflecting surfaces in the end of said independent casing remote from said light passage tubes having their inter-section in a plane substantially normal to the longitudinal axis of said casing, a pair of measuring and halving prisms adjustably positioned in alignment with said reflecting surfaces, a rotary control member for selecting the position of said prisms, a spring clutch for fixing said prisms in the positions thus selected, and a system of eye-piece prisms arranged in the end of said independent casing adjacent said light passage tubes for receiving light rays from said last mentioned reflecting surfaces.

In testimony whereof I affix my signature.

FELIX H. CARSSOW.